UNITED STATES PATENT OFFICE.

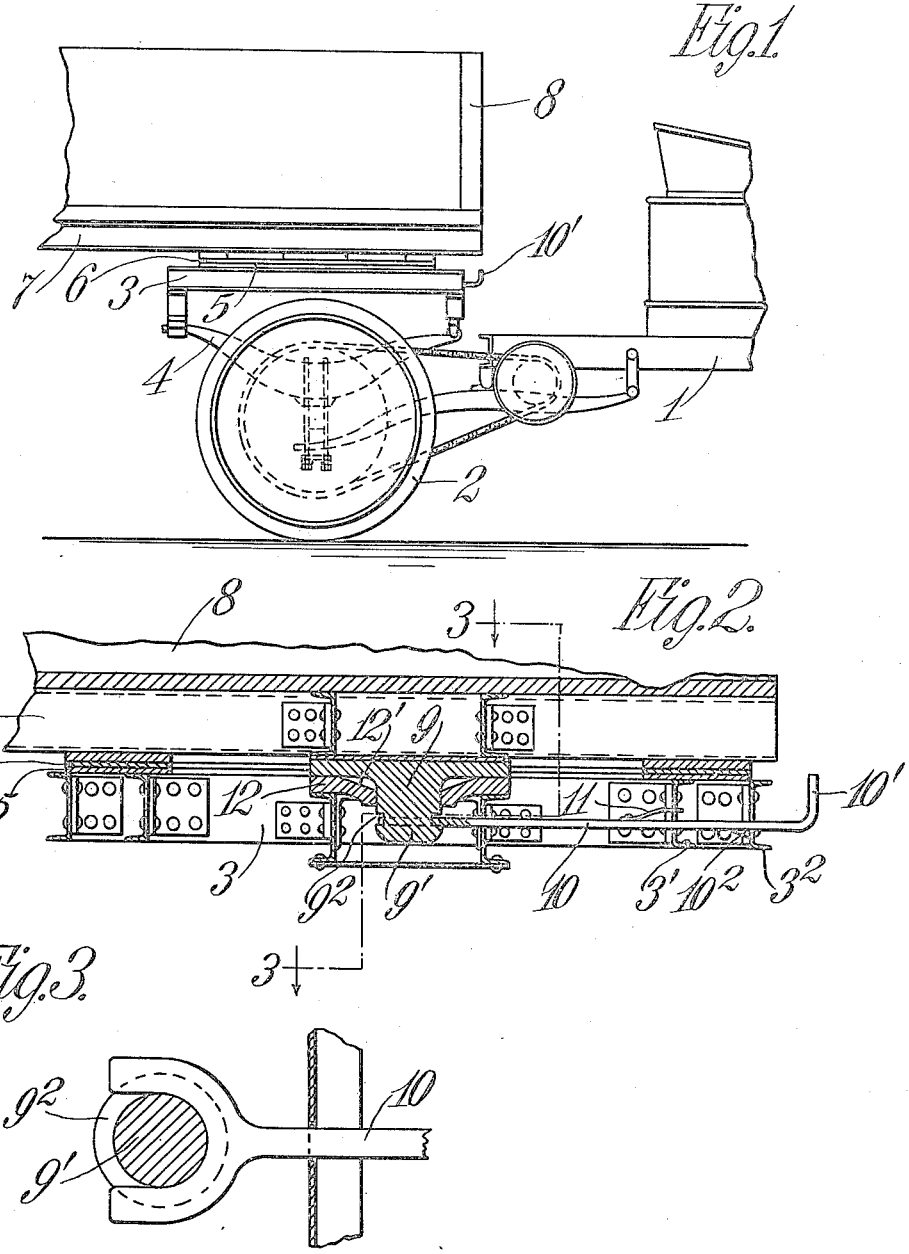

JOHN A. MARTIN, OF INDIANAPOLIS, INDIANA.

RUNNING-GEAR FOR VEHICLES.

1,183,313.  Specification of Letters Patent.  Patented May 16, 1916.

Application filed November 14, 1914. Serial No. 872,108.

*To all whom it may concern:*

Be it known that I, JOHN A. MARTIN, a citizen of the United States of America, residing in the city of Indianapolis, county of Marion, State of Indiana, have invented certain new and useful Improvements in Running-Gear for Vehicles, of which the following is the specification.

This invention relates to improvements in running gear for vehicles and while capable for general application it is particularly adapted for vehicles of the tractor and trailer type.

The term "running gear" as here used generally involves a pair of mating fifth wheel members, a pair of mating bolster plates, and a king-pin or its equivalent passing through said plates. These elements are commonly employed to form a pivotal connection between the axle of a vehicle and the body thereof.

The object of the invention is to provide improved means to lock the mating bolster plates together conveniently operable to prevent an objectionable relative vertical movement between the bolster plates.

My improved running gear is especially adapted for use in the tractor and trailer combination. Such a combination of vehicles commonly comprises a tractor or traction vehicle carrying running gear elements and a trailer unit without forward wheels which carries other running gear elements adapted to engage and mate with the corresponding elements on the tractor. In use, the tractor transports the trailer to its destination and leaves it to be emptied. The tractor is frequently used with successive trailers. During the operation of unloading the trailer, the tractor may return and haul one or more other similar trailer units. In any case the two units of the combination are frequently coupled and uncoupled. It will, therefore, be seen that running gear for the tractor and trailer combination must meet conditions entirely different from those encountered in ordinary vehicle construction for it is important and desirable that the mating running gear elements be readily separable and detachable to permit rapid coupling and uncoupling of the two units of the combination.

In general, my device comprises a pair of bolster plates one of which is secured to the trailer and the other to the tractor. The usual king-pin, passing centrally through these bolster-plates, is in my improved device eliminated. The upper bolster-plate has formed integrally therewith a depending portion which is adapted to pass through an opening in the lower plate. The lower end of this portion is rounded and the area adjacent the opening in the lower plate is downwardly inclined toward the opening. This structure permits rapid coupling of the vehicles since accurate positioning of the mating plates one above the other is unnecessary. I, furthermore, employ means conveniently operable to coöperate with the depending portion of the upper bolster-plate to lock the latter and the lower plate, whereby relative vertical movement between the plates is prevented. The usual fifth wheels or side bearing plates are employed.

In the accompanying drawings, wherein I show for the purposes of illustration one preferred embodiment of my invention, Figure 1 is a partial side elevational view showing a coupled tractor and trailer with my improved running gear applied thereto; Fig. 2 is a partial vertical section taken on the central longitudinal plane of Fig. 1. This view is drawn to an enlarged scale and clearly shows the running gear elements in coupled relation; Fig. 3 is a partial sectional plan view taken on the line 3—3 of Fig. 2, and looking in the direction of the arrows.

Referring to the drawings in detail and in particular to Fig. 1: The rear portion of a tractor is indicated at 1 in conventional form only. The rear wheels of the tractor are shown at 2 and secured to the axle thereof are the semi-elliptical springs 4 which support a frame-work 3.

8 represents the trailer unit which is supported on a frame 7. The frame members 3 and 7 carry the running gear elements which will now be described.

Referring to Fig. 2; 5 and 6 represent a pair of mating fifth wheels which are secured to the frames 3 and 7, respectively. These fifth wheels are of a well-known form and comprise in reality side bearing or rubbing plates for the pivotal connection between the two vehicles. Secured to the frame 7 and centrally with respect to the fifth wheel 6 is an upper bolster-plate 9 and secured to the frame 3 is a lower bolster-plate 12. Formed integrally with the upper plate 9 is a centrally located cylindrical depending portion 9'. The lower plate 12 has a centrally located hole through which the portion 9' is adapted to pass. Around this hole in the plate 12 is an annular portion 12' which is downwardly inclined toward the hole. The lower end of the depending member 9' is rounded as clearly shown in Fig. 2, and this rounded end is adapted to coöperate with the annular portion 12' to facilitate the rapid coupling of the two vehicles as will later be described.

The member 9' extends below the lower plate 12 and in this extended portion is formed a circular recess $9^2$. Slidably mounted in the frame 3 of the tractor is a rod 10 which extends longitudinally of the frame and is provided at its outermost extremity with an upturned portion 10'. The inner end of the rod 10 is forked and engages in the recess $9^2$ as clearly shown in Fig. 3. Fixed to the rod 10 is a flat spring 11 which rests in a hole in the portion 3' of the frame 3 and bears upwardly thereagainst. A depending lug $10^2$ is also secured to the rod 10, and this lug normally bears against the member $3^2$ of the frame 3 and thereby prevents sliding movement of the rod 10.

It will be seen from an inspection of Fig. 1 that the upturned end 10' of the rod 10 is readily accessible from the driver's seat of the tractor. Therefore, when the trailer is to be uncoupled, the driver may simply reach backward and operate the rod 10 without leaving his seat. In unlocking the two plates 9 and 12, the end 10' is first lifted upwardly in the enlarged hole in the member $3^2$ which releases the lug $10^2$ from its locking position. Then, as the rod 10 is pulled toward the driver's seat, the forked ends are withdrawn from the recess $9^2$, and the trailer may then be uncoupled. The two units may be uncoupled in any of the usual ways, for example, the front end of the trailer may be jacked up from the ground. As soon as the member 9' is released by the withdrawal of the rod 10, it may then readily pass through the opening in the lower plate 12, and thereafter the tractor is free to leave for another trailer.

When it is desired to couple the tractor to the trailer unit, the rod 10 is again withdrawn as described, and the tractor is backed under the trailer. It is to be noted that, when the tractor is backed in under the fore part of the trailer, it is unnecessary accurately to position the hole in the lower plate 12 with respect to the member 9'. These two elements automatically aline with each other if the rounded end of the member 9' strikes anywhere on the annular inclined surface 12'. If the member 9' does not strike the hole in the plate 12, when the tractor unit is lowered, the weight of the trailer upon the member 9' will have a tendency to force it downwardly on the inclined surface 12, into the hole. Thus, much valuable time is saved which is ordinarily used in accurately alining the mating bolster-plates and moving the king-pin. After the plates 9 and 12 are placed in engagement, the driver, without leaving his seat, pushes the rod 10 inwardly, and the forked ends thereof again engage the recess $9^2$ and lock the plates together. As the rod 10 is moved inwardly, the lug $10^2$ snaps into engagement with the frame member $3^2$, and the spring 11 serves to hold it in this position.

With the usual running gear which involves a separate king-pin, it is necessary to unlock and remove the same before the vehicles can be uncoupled. This ordinarily necessitates someone crawling under the vehicle. With my improved running gear, this operation is eliminated, and the driver need not leave his seat to unlock the bolster-plates. Thus, the member 9' performs all the functions of a king-pin without the disadvantages incident to the use of the usual king-pin. It will be seen that my improved running gear is especially adapted for use in the pivotal connection between a tractor and trailer, and, when so used, adds to the efficiency and convenience of this combination of vehicles.

It is recognized that various modifications may be made in the structure herein described without departing from the scope of my invention which is defined in the following claims.

What I claim is:

1. In a tractor and trailer combination of vehicles and in combination, a bolster plate adapted to be secured to the tractor, a second bolster plate adapted to be secured to the trailer, one of said plates formed with an opening, a part on the other plate adapted to pass through said opening and a device engageable and disengageable at will with said part below said plates and arranged to lock the latter against relative vertical movement, said means extending to a distance laterally of said bolster plates for convenient operation, said part arranged to serve as an operable king pin for backing, hauling and turning movements with or without the coöperative engagement of said device therewith.

2. In a running gear for vehicles and in combination, a pair of mutually engageable bolster-plates, one thereof being formed with an opening therein, a depending part formed on the other of said plates arranged to pass through said opening, whereby a pivotal connection is formed, said part having a recess formed therein, and means arranged to engage said recess to lock said plates against relative vertical movement, said means comprising a slidable member with a forked end, and a device to hold said end in engagement with said recess.

3. In combination, a lower bolster-plate having a centrally arranged dish-shaped surface surrounding a centrally disposed hole, an upper bolster plate having a depending portion to enter said hole, a pair of fifth wheel supporting plates, means to lock the depending portion in said hole, comprising a member detachably engageable with said portion below the lower bolster plate having an operable connection therefor extending laterally beyond the fifth wheel plates.

JOHN A. MARTIN.

Witnesses:
ALBERT M. BRISTOR,
W. A. BRISTOR.